United States Patent [19]

Imai et al.

[11] Patent Number: 4,786,625
[45] Date of Patent: Nov. 22, 1988

[54] DEHYDROGENATION CATALYST COMPOSITON

[75] Inventors: Tamotsu Imai, Mt. Prospect; Hayim Abrevaya, Chicago; Jeffery C. Bricker, Buffalo Grove; Deng-Yang Jan, Mt. Prospect, all of Ill.

[73] Assignee: UOP Inc., Des Plaines, Ill.

[21] Appl. No.: 131,882

[22] Filed: Dec. 11, 1987

Related U.S. Application Data

[63] Continuation-in-part of Ser. No. 18,541, Feb. 25, 1987, Pat. No. 4,716,143, which is a continuation-in-part of Ser. No. 871,356, Jun. 6, 1986, abandoned.

[51] Int. Cl.$^4$ .................. B01J 21/04; B01J 23/58; B01J 23/62
[52] U.S. Cl. .................. 502/326; 502/327; 502/328; 502/330; 502/349; 502/352; 502/514; 502/523; 502/527; 585/443; 585/444; 585/445; 585/660
[58] Field of Search ............... 585/443, 444, 445, 660; 502/326, 327, 328, 330, 349, 352, 514, 523, 527

[56] References Cited

U.S. PATENT DOCUMENTS

| 3,651,167 | 3/1972 | De Rosset | 260/681.5 |
| 3,755,481 | 8/1973 | Hayes | 585/444 |
| 3,761,531 | 9/1973 | Brock | 585/444 |
| 4,104,317 | 8/1978 | Antos | 585/444 |
| 4,672,146 | 6/1987 | Abrevaya et al. | 585/444 |
| 4,716,143 | 12/1987 | Imai | 585/444 |

Primary Examiner—Asok Pal
Attorney, Agent, or Firm—Thomas K. McBride; John F. Spears, Jr.; A. Blair Hughes

[57] ABSTRACT

A novel catalytic composite comprising a platinum group metal component; a modifier metal component selected from the group consisting of a tin component, germanium component, rhenium component and mixtures thereof; an optional alkali or alkaline earth metal component or mixtures thereof, an optional halogen component, and an optional catalytic modifier component on a refractory oxide support having a nominal diameter of at least about 850 microns. The distribution of the platinum group metal component is such that the platinum group component is surface-impregnated where substantially all of the platinum group metal component is located at most within a 400 micron exterior layer of the support. The effective amount of the modifier metal component is uniformly dispersed throughout the refractory oxide support. The distribution of the surface-impregnated platinum metal component is such that the novel catalyst has particular utility as a hydrocarbon dehydrogenation catalyst in a hydrocarbon dehydrogenation process.

12 Claims, 6 Drawing Sheets

DEHYDROGENATION CATALYST COMPOSITON

CROSS-REFERENCE TO RELATED APPLICATIONS

This application is a continuation-in-part of prior copending application Ser. No. 018,541 filed Feb. 25, 1987 now U.S. Pat. No. 4,716,143 which in turn is a continuation-in-part of application Ser. No. 871,356 filed June 6, 1986, now abandoned, the contents of which are incorporated herein by reference thereto.

BACKGROUND OF THE INVENTION

This invention relates to the conversion of hydrocarbons, especially the dehydrogenation of dehydrogenatable hydrocarbons, in the presence of a catalyst composite. This invention also pertains to a new catalyst composite and a method of making it.

The dehydrogenation of hydrocarbons is an important commercial process because of the great demand for dehydrogenated hydrocarbons for the manufacture of various chemical products such as detergents, high octane gasolines, pharmaceutical products, plastics, synthetic rubbers, and other products well known to those skilled in the art. One example of this process is dehydrogenating isobutane to produce isobutylene which can be polymerized to provide tackifying agents for adhesives, viscosity-index additives for motor oils and impact-resistant and anti-oxidant additives for plastics.

INFORMATION DISCLOSURE

Numerous catalytic composites comprising a platinum group component and a modifier metal component selected from the group consisting of a tin component, germanium component, rhenium component, and mixtures thereof are known. For example related U.S. Pat. Nos. 3,632,503, 3,755,481, and 3,878,131 disclose catalysts comprising a platinum group component, a tin component, and a germanium component on a porous carrier material. However, these references disclose that best results are achieved when a germanium component is uniformly distributed throughout the carrier material. However, the reference is silent as to any advantage to be achieved by limiting the location of substantially all of the catalytic metals to an outer layer of the catalyst particle. In fact, it is indicated in these references that it is preferred that the catalytic composite thereof be subjected to a substantially water-free reduction step prior to its use in the conversion of hydrocarbons. It is further disclosed that the step is designed to ensure a uniform and finely divided dispersion of metallic components throughout the carrier material.

Related U.S. Pat. Nos. 3,682,838 and 3,761,531 disclose catalytic composites comprising a platinum group component, and a Group IVA metallic component. As with the previous references it is disclosed therein that it is preferred that the catalysts are subjected to a reduction step prior to their use. It is further disclosed in these references that the reduction step is designed to assure uniform distribution of the metallic particles throughout the catalysts.

U.S. Pat. Nos. 3,558,477, 3,562,147, 3,584,060, and 3,649,566 all disclose catalytic composites comprising a platinum group component, and a rhenium component on a refractory oxide support. However, as before these references disclose that the best results are achieved when the platinum group component and rhenium component are uniformly distributed throughout the surface and pores of the catalyst.

U.S. Pat. No. 3,897,368 describes a method for the production of a noble metal containing catalyst where the noble metal is platinum and the platinum is the only catalytic metal present and it is deposited selectively upon the external surface of the catalyst. This disclosure describes a method of producing a catalyst containing platinum only by impregnating platinum on the exterior layer of the particle. The method claimed utilizes a non-ionic surface active agent to achieve the surface impregnation of the noble metal. Additionally, U.S. Pat. Nos. 3,367,888; 3,931,054; and 3,259,589 all teach methods of impregnating a catalyst with a Group VIII metal component that is similar to the method employed to produce the surface-impregnated catalyst of the instant invention. However, the '054 patent describes a method of impregnating a catalyst base such that the Group VIII metal component is located below the surface of the catalyst. In addition, the '368, '888, and '589 patents describe a method of making a catalyst where said catalyst does not contain the useful modifier metal components of the instant invention. Thus, while these disclosures describe a portion of the method used to fabricate the catalyst of the instant invention, they do not teach the entire method as described herein. Surprisingly, it has been discovered that by surface impregnating upon the catalyst support substantially all of the platinum group metal component and uniformly impregnating the other catalytic effective components, a catalyst displaying improved performance in a dehydrogenation process is obtained.

OBJECTS AND EMBODIMENTS

It is, therefore, an object of the present invention to provide an improved catalytic composite and a method of making the same. A corollary objective is to provide an improved process for the conversion of hydrocarbons especially for the dehydrogenation of hydrocarbons.

Accordingly, in a broad embodiment, the present invention is a catalytic composite comprising a platinum group metal component; a modifier metal component selected from the group consisting of a tin component, germanium component, rhenium component and mixtures thereof; and an optional alkali metal component, or an optional alkaline earth metal component or mixtures thereof on a refractory oxide support having a nominal diameter of at least about 850 microns wherein the platinum group component is surface-impregnated upon the refractory oxide support such that the average concentration of the surface-impregnated platinum group component on the outside 100 micron layer of the catalyst particle is at least 2 times the concentration of the platinum group component in the 200 micron diameter center core of the catalyst. The effective amount of the modifier metal component is uniformly dispersed throughout the catalyst.

In yet another embodiment, the invention is a hydrocarbon conversion process comprising the steps of contacting a hydrocarbon at hydrocarbon conversion conditions with a catalytic composite comprising a platinum group metal component; a modifier metal component selected from the group consisting of a tin component, germanium component, rhenium component and mixtures thereof; and an optional alkali or alkaline earth metal component on a refractory oxide support having a nominal diameter of at least about 850 microns wherein the platinum group component is surface-impregnated such that the average concentration of the surface-impregnated platinum group component on the outside 100 micron layer of the catalyst is at least 2 times the concentration of the platinum group component in the 200 micron diameter center core of the catalyst, and wherein the effective amount of the modifier metal component is uniformly dispersed throughout the catalyst.

DETAILED DESCRIPTION OF THE INVENTION

Figure 1:
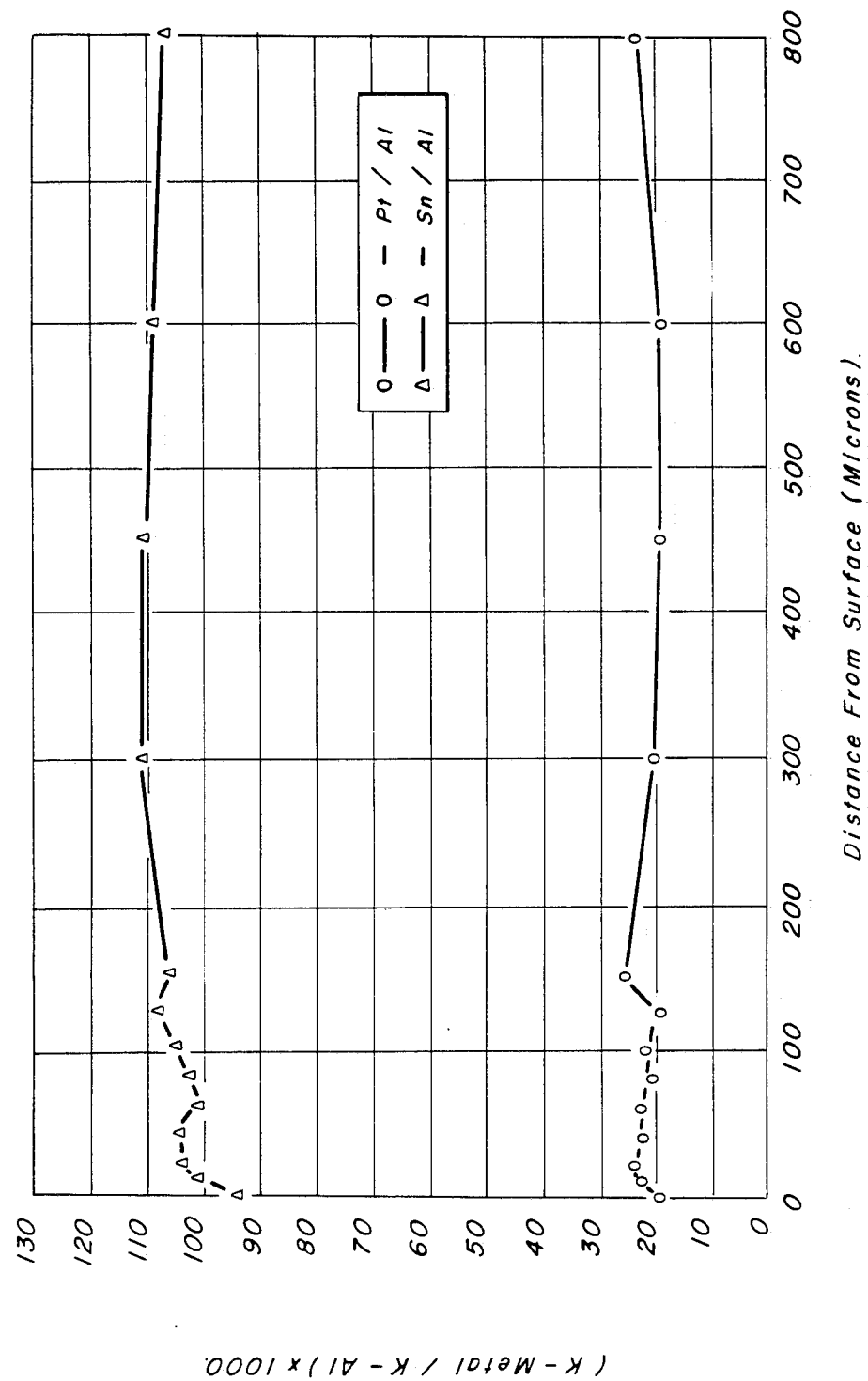
FIGS. 1 through 6 are graphical representations of the platinum group metal and modifier metal gradient across the radius of catalysts of Examples I, II, III, V, and VI, respectively. The metals distribution is presented as a ratio of a specific metal concentration to the aluminum in alumina concentration plotted against the distance in microns from the surface of the particle. The distributions were determined by utilizing an energy dispersive X-ray analyzer (EDX) coupled to a scanning electron microscope (SEM). It should be noted that the plots do not represent actual metal content, but only the relative concentration of the metal across the radius of a catalyst pill.

To summarize, the present invention is an improved catalytic composite as well as a process for the use thereof.

An essential feature of the catalyst of the present invention is that a platinum group metal component is surface-impregnated upon a catalytic support material such that the concentration of the platinum group component in the outer 100 micron layer of the catalyst is at least twice that of the 200 micron diameter center core of the catalyst support. The catalyst also comprises a modifier metal component which is uniformly dispersed throughout the catalyst support. An alkali and/or alkaline metal component, and other optional modifiers may also be incorporated into the catalyst. It is to be understood that the term "exterior" is defined as the outermost layer of the catalyst particle. By "layer", it is meant a stratum of substantially uniform thickness.

A platinum group metal component is considered to be surface-impregnated when the average concentration of said metal component within the 100 micron exterior layer of the catalyst is at least about two times the average concentration of the same metal component in the 200 micron diameter center core of the catalyst. In addition to the surface-impregnated platinum group component, a uniformly dispersed modifier metal component is also an aspect of this invention. That is to say that the concentration of the modifier metal component is essentially the same across the entire diameter of the catalyst particle. The platinum group metal component may be alternatively described as being surface impregnated such that substantially all of the platinum group component is located within at most the 400 micron exterior layer of the catalyst support. By "substantially all", it is meant at least about 75% on an elemental basis of the platinum group component in question. This characterization of the catalytic composite is intended to describe a platinum group metal concentration gradient upon and within the catalyst support. The concentration of the platinum group component within the 100 micron layer surface of the support is as stated at least twice that of the platinum group component concentration within the 200 micron in diameter center of the catalyst. The surface-impregnated metal concentration then tapers off as the center of the support is approached. The actual gradient of the platinum group metal component within the catalyst support varies depending upon the exact manufacturing method employed to fabricate the catalyst. However, it is desired to place as much of the surface-impregnated platinum group metal upon the 100 micron exterior layer of the catalyst particle as possible so the expensive metal component can be efficiently used in a dehydrogenation process. Therefore, the distribution of the platinum group metal component is best described as being both surface-impregnated and substantially all located within at most the 400 micron exterior layer of the support where "substantially all" is meant at least about 75% of the component.

As previously stated, the support material has a nominal diameter of 850 microns. For a catalyst support material which approaches this diameter, the exterior layer wherein 75% of the surface-impregnated platinum group component is located will approach 100 microns. The exterior layer wherein 75% of the surface-impregnated components are located will approach a maximum value of 400 microns as the diameter of the catalyst support increases beyond 2000 microns.

Although it is not understood completely, it is believed that by restricting substantially all of the surface-impregnated platinum group metal component to at most a 400 micron wide exterior layer of the catalyst support, more facile access to these catalytic sites is achieved, allowing the hydrocarbon reactants and products much shorter diffusion paths. By decreasing the length of the diffusion paths, the reactants and products have a shorter residence time in the presence of catalytically active sites on the particle, thereby reducing the likelihood of undesirable secondary reactions. This results in an increase in conversion and selectivity to the desired product. For example, in the dehydrogenation of a paraffin to a monoolefin, reducing the length of the diffusion path decreases the chances of dehydrogenating the desired monoolefin consecutively to undesirable skeletal isomers, cracked products, and aromatics by their readsorption onto a catalytic site before they can exit the catalyst particle.

An essential feature of the present invention is a modifier metal component selected from the group consisting of a tin component, germanium component, a rhenium component, and mixtures thereof. As heretofore indicated, the effective amount of the modifier metal component is uniformly dispersed throughout the catalyst. Generally, the catalyst will comprise from about 0.01 to about 10 wt. % modifier metal component calculated on an elemental basis on the weight of the final composite. Preferably, the catalyst will comprise from about 0.1 to about 5 wt. % modifier metal component.

As mentioned, the modifier metal component is essentially uniformly dispersed throughout the catalyst particle. This uniform dispersion can be achieved in a number of ways including impregnation of a catalyst with a modifier metal containing solution, and incorporating a tin component into the catalyst during catalyst base formulation. The latter method, incorporating the modifier metal into the catalyst during the preparation of the base is the preferred method of the present invention.

Specifically, this method involves adding a modifier metal component to the refractory oxide support during its preparation. In the case where the catalyst is formulated from a sol of the desired refractory oxide, the modifier metal would be incorporated into the sol before the catalyst was shaped. If the catalyst was formulated from a powder of the desired refractory oxide, the modifier would be added again prior to the shaping of the catalyst in the form of a dough into a particle. As mentioned previously, the catalyst base may be uniformly impregnated with a modifier metal containing solution, but the incorporation of the modifier metal into the catalyst base during its preparation uniformly distributes the modifier metal throughout the catalyst so than an impregnation step is not required.

When the modifier metal component of the present invention comprises a germanium component, all of the germanium component may be present in the catalyst in an oxidation state above that of the elemental metal. This component may exist within the composite as a compound such as the oxide, sulfide, halide, oxychloride, aluminate, etc., or in combination with the carrier material or other ingredients of the composite. Preferably, the germanium component is used in an amount sufficient to result in the final catalytic composite containing, on an elemental basis, about 0.01 to about 10 wt. % germanium, with best results typically obtained with about 0.1 to about 5 wt. % germanium.

Alternatively, the modifier metal component may comprise a tin component. This component may be present as an elemental metal, as a chemical compound such as the oxide, sulfide, halide, oxychloride, etc., or as a physical or chemical combination with the porous carrier material and/or other components of the catalytic composite. The tin component is preferably utilized in an amount sufficient to result in a final catalytic composite containing about 0.01 to about 10 wt. % tin, calculated on an elemental basis, with best results obtained at a level of about 0.1 to about 5 wt. %.

Yet another alternative modifier metal component may comprise a rhenium component. This component may be present as an elemental metal, as a chemical compound such as the oxide, sulfide halide, etc., or as a physical or chemical combination with the porous carrier material and/or other components of the catalytic composite. The rhenium component is preferably utilized in an amount sufficient to result in a final catalytic composite containing about 0.01 to about 5 wt. % rhenium, calculated on an elemental basis.

Regarding the preferred amounts of the various modifier metal components of the subject catalyst, it has been found to be good practice to specify the amounts of the rhenium component, the germanium component, and the tin component as a function of the concentration of the surface-impregnated platinum group component. On this basis, the amount of the rhenium component is ordinarily selected so that the atomic ratio of the platinum group metal to rhenium contained in the composite is about 0.05:1 to about 2.75:1, with the preferred range being about 0.25:1 to about 2:1. Similarly, the amount of the tin component is ordinarily selected to produce a composite containing an atomic ratio of the platinum group metal to tin of about 0.1:1 to about 5:1 with the preferred range being about 0.5:1 to about 3:1. The amount of the germanium component is ordinarily selected to produce a composite containing an atomic ratio of germanium to platinum group metal of about 0.25:1 to about 5:1.

The platinum group metal and modifier metal components and other catalytic components may be incorporated into the catalytic composite of the invention by any means suitable to result in surface impregnation of the platinum group metal component, and the uniform dispersion of the modifier metal and other catalytic components wherein substantially all of the surface-impregnated platinum group metal components is located such that the average concentration of the surface-impregnated platinum group component on the outside 100 micron layer of the catalyst particle is at least 2 times the concentration of the surface-impregnated platinum group component in the 200 micron diameter center core of the catalyst.

The platinum group component is preferably surface impregnated via the formulation of a chemical complex of the platinum group component. The complex formed is strongly attracted to the refractory oxide support and this strong attraction results in the complex which contains a platinum group metal being retained primarily upon the outer surface of the catalyst.

Any compound that is known to complex with the desired platinum group component and with the metal component of the refractory oxide support is useful in the preparation of the surface-impregnated catalyst of the present invention. However, it has been found that a multi-dentated ligand is very useful in complexing with a platinum group metal and the refractory oxide support resulting in the surface impregnation of the platinum group metal. Multi-dentated ligands are compounds that contain more than one appendage that can bond strongly to the oxide support. Such appendages would typically comprise carboxylic acids, amino groups, thiol groups, phosphorus groups, or other strongly polar groups of chemical components. It is also an aspect of this invention that the multi-dentated ligand contains: a functional group such as -SH or $PR_2$ (where R is a hydrocarbon) that has a high affinity towards the platinum group metal component and a second functional group comprising a carboxylic acid or the like component that can be strongly adsorbed onto the metal oxide support.

This preferred property of the multi-dentated ligand effectively insures that the platinum group metal component does not penetrate the catalyst particle by binding strongly with the platinum group metal while also binding to the support quickly and strongly. Examples of some useful multi-dentated ligands include thiomalic acid, thiolactic acid, mercapto propionic acid, thiodiacetic acid, thioglycollic acid, and thioproponic acid among others.

The preferred multi-dentated ligand of the instant invention is thiomalic acid. The thiomalic acid, the platinum group metal, and the catalyst base can be combined in a number of ways which result in the surface impregnation of the catalyst base with the platinum group metal. In one method, thiomalic acid and a platinum group metal are allowed to complex in a solution before introduction of a catalyst base to the solution. The complex containing solution is evaporated with the complex containing the platinum group metal remaining on the outside layer of the catalyst particle resulting in the surface impregnation of the platinum group metal.

In an alternative method, the refractory oxide support is allowed to contact a solution containing thiomalic acid for a time. A second solution containing a platinum group metal is then added to the mixture and the solution containing the mixture is evaporated. The platinum group metal complexes with the thiomalic acid already on the outer portion of the catalyst. This procedure also results in the surface impregnation of the platinum group metal.

Typical of some of the platinum group compounds which may be employed in preparing the catalyst of the invention are chloroplatinic acid, ammonium chloroplatinate, bromoplatinic acid, platinum dichloride, platinum tetrachloride hydrate, platinum dichlorocarbonyl dichloride, dinitrodiaminoplatinum, palladium chloride, palladium chloride dihydrate, palladium nitrate, etc. Chloroplatinic acid is preferred as a source of platinum.

Germanium compounds which may be used include germanium oxide, germanium tetraethoxide, germanium tetrapropoxide, germanium tetrachloride, germanium difluoride, germanium tetrafluoride, germanium di-iodide, germanium monosulfide and the like compounds. One particularly preferred impregnation solution comprises nascent germanium metal dissolved in chlorine water to yield a germanium oxychloride. A second preferred impregnation solution comprises germanium tetrachloride dissolved in anhydrous ethanol.

Suitable tin salts or water-soluble compounds of tin which may be used include stannous bromide, stannous chloride, stannic chloride, stannic chloride pentahydrate, stannic chloride tetrahydrate, stannic chloride trihydrate, stannic chloride diamine, stannic trichloride bromide, stannic chromate, stannous fluoride, stannic fluoride, stannic iodide, stannic sulfate, stannic tartrate, and the like compounds. The utilization of a tin chloride compound, such as stannous or stannic chloride is particularly preferred.

Typical of rhenium compounds which may be used are ammonium perrhenate, sodium perrhenate, potassium perrhenate, and the like salts. In addition, solutions of rhenium halides such as rhenium chloride may be used; the preferred impregnation solution is, however, an aqueous solution of perrhenic acid.

The platinum group component and modifier metal component may be composited with the support in any sequence. Thus, the platinum group component may be surface impregnated on the support followed by sequential uniform impregnation of one or more modifier metal components. Alternatively, the modifier metal component or components may be uniformly impregnated on the support or incorporated into the support during its formulation, followed by surface impregnation with the platinum group component. It is also contemplated that the platinum group component and modifier metal component may be surface-impregnated upon a refractory oxide support throughout which the same modifier metal component is uniformly located. However, it is preferred that the modifier metal be incorporated into the catalyst during the formulation of the base and prior to the surface impregnation of the platinum group metal upon the catalyst base.

As indicated above, the present invention involves use of a catalytic composite containing an optional alkali metal component, or an alkaline earth metal component or mixtures thereof. More specifically, this component is selected from the group consisting of the compounds of the alkali metals—cesium, rubidium, potassium, sodium, and lithium—and of the alkaline earth metals—calcium, strontium, barium, magnesium and beryllium. This component may exist within the catalytic composite as a relatively stable compound such as the oxide or sulfide or in combination with one or more of the other components of the composite, or in combination with an alumina carrier material such as in the form of a metal aluminate. Since, as is explained hereinafter, the composite containing the alkali or alkaline earth metal component is always calcined in an air atmosphere before use in the conversion of hydrocarbons, the most likely state this component exists in during use in dehydrogenation is the metallic oxide. Regardless of what precise form in which it exists in the composite, the amount of this component utilized is preferably selected to provide a composite containing about 0.01 to about 10 wt. % of the alkali or alkaline earth metal, and more preferably about 0.05 to about 5 wt. %. The optional alkali or alkaline earth component is preferably but not necessarily uniformly distributed throughout the catalyst particle. Best results are ordinarily achieved when this component is a compound of lithium, potassium, cesium, or mixtures thereof.

This alkali or alkaline earth metal component may be combined with the porous carrier material in any manner known to those skilled in the art such as by impregnation, coprecipitation, physical admixture, ion exchange, etc. However, the preferred procedure involves impregnation of the carrier material either before or after it is calcined and either before, during, or after the other components are added to the carrier material. Best results are ordinarily obtained when this component is added in conjunction with or after the platinum group component and modifier metal component. Typically, the impregnation of the carrier material is performed by contacting same with a solution of a suitable, decomposable compound or salt of the desired alkali or alkaline earth metal. Hence, suitable compounds include the halides, sulfates, nitrates, acetates, carbonates, and the like compounds. For example, excellent results are obtained by impregnating the carrier material after the platinum group component has been combined therewith with an aqueous solution of lithium nitrate or potassium nitrate.

The catalytic composite of the present invention may also contain a halogen component. The halogen component may be either fluorine, chlorine, bromine or iodine or mixtures thereof. Chlorine and bromine are the preferred halogen components. The halogen component is generally present in a combined state with the porous carrier material and alkali component. Although not essential to the invention, the halogen component is preferably well dispersed throughout the catalytic composite. The halogen component may comprise from more than 0.2 to about 15 wt. %, calculated on an elemental basis, of the final catalytic composite.

The halogen component may be incorporated in the catalytic composite in any suitable manner, either during the preparation of the carrier material or before, while or after other catalytic components are incorporated. For example, the alumina sol utilized to form the preferred aluminum carrier material may contain halogen and thus contribute at least some portion of the halogen content in the final catalyst composite. Also, the halogen component or a portion thereof may be added to the catalyst composite during the incorporation of the carrier material with other catalyst components, for example, by using chloroplatinic acid in impregnating a platinum component. Also, the halogen component or a portion thereof may be added to the catalyst composite by contacting the catalyst with the halogen or a compound, solution, suspension or dispersion containing the halogen before or after other catalyst components are incorporated with the carrier material. Suitable compounds containing the halogen include acids containing the halogen, for example, hydrochloric acid. Or, the halogen component or a portion thereof may be incorporated by contacting the catalyst with a compound, solution, suspension or dispersion containing the halogen in a subsequent catalyst regeneration step.

Optionally, the catalyst of the present invention may also contain a sulfur component. Generally, the sulfur component may comprise about 0.01 to 2 wt. %, calculated on an elemental basis, of the final catalytic composite. The sulfur component may be incorporated into the catalytic composite in any suitable manner. Preferably, sulfur or a compound containing sulfur such as hydrogen sulfide or a lower molecular weight mercaptan, for example, is contacted with the catalyst composite in the presence of hydrogen at a hydrogen to sulfur molar ratio of about 100 and a temperature of from about 10° to about 540° C., preferably under water-free conditions, to incorporate the sulfur component.

Optionally, the catalyst may also contain other, additional components or mixtures thereof which act alone or in concert as catalyst modifiers to improve catalyst activity, selectivity or stability. The catalyst modifiers are preferably but not necessarily dispersed throughout the catalyst particle in a uniform distribution. Some well-known catalyst modifiers include antimony, arsenic, bismuth, cadmium, chromium, cobalt, copper, gallium, gold, indium, iron, manganese, nickel, scandium, silver, tantalum, thallium, titanium, tungsten, uranium, zinc, and zirconium. A component selected from the group consisting of a thallium component, gallium component and indium component is preferred. These additional components may be added in any suitable manner to the carrier material during or after its preparation, or they may be added in any suitable manner to the catalytic composite either before, while or after other catalytic components are incorporated.

Preferably, the catalyst of the present invention is nonacidic. "Nonacidic" in this context means that the catalyst has very little skeletal isomerization activity, that is, the catalyst converts less than 10 mole % of butene-1 to isobutylene when tested at dehydrogenation conditions and, preferably, converts less than 1 mole %. The acidity of the catalyst can be decreased if necessary to make the catalyst nonacidic by increasing the amount of the alkali component within the claimed range, or by treating the catalyst with steam to remove some of the halogen component.

After the catalyst components have been combined with the porous carrier material, the resulting catalyst composite will generally be dried at a temperature of from about 100° to about 320° C. for a period of typically about 1 to 24 hours or more and thereafter calcined at a temperature of about 320° to about 600° C. for a period of about 0.5 to about 10 or more hours. Finally, the calcined catalyst composite is typically subjected to a reduction step before use in the hydrocarbon conversion process. This reduction step is effected at a temperature of about 100° to about 650° C. for a period of about 0.5 to about 10 or more hours in a reducing environment, preferably dry hydrogen, the temperature and time being selected to be sufficient to reduce substantially all of the platinum group component to the elemental metallic state.

Regarding the refractory oxide support, it is preferably a porous, absorptive support with high surface area of from about 5 to about 500 m$^2$/g. The porous carrier material should be relatively refractory to the conditions utilized in the hydrocarbon conversion process. It is intended to include within the scope of the instant invention the use of carrier materials which have traditionally been utilized in hydrocarbon conversion catalysts such as, for example (1) activated carbon, coke, or charcoal; (2) silica or silica gel, silicon carbide, clays, and silicates, including synthetically prepared and naturally occurring ones, which may or may not be acid treated, for example, attapulgus clay, china clay, diatomaceous earth, fuller's earth, kaolin, kieselguhr, etc.; (3) ceramics, porcelain, crushed firebrick, bauxite; (4) refractory inorganic oxides such as alumina, titanium dioxide, zirconium dioxide, chromium oxide, beryllium oxide, vanadium oxide, cerium oxide, hafnium oxide, zinc oxide, magnesia, boria, thoria, silica-alumina, silica-magnesia, chromia-alumina, alumina-boria, silica-zirconia, etc.; (5) crystalline zeolitic aluminosilicates such as naturally occurring or synthetically prepared mordenite and/or faujasite, for example, either in the hydrogen form or in a form which has been exchanged with metal cations, (6) spinels such as $MgAl_2O_4$, $FeAl_2O_4$, $ZnAl_2O_4$, $CaAl_2O_4$, and other like compounds having the formula $MO-Al_2O_3$ where M is a metal having a valence of 2; and (7) combinations of materials from one or more of these groups. The preferred carrier material for the instant catalyst is alumina, especially gamma- or eta-alumina.

While not a specific aspect of this invention, it is anticipated that a crystalline aluminosilicate zeolite could comprise a portion of the catalyst support of this invention. Such a support would be a mixture of a refractory oxide support and a zeolite. The support could then be impregnated with catalytic components as explained herein.

As heretofore indicated, the oxide support of the present invention has a nominal diameter of at least about 850 microns. By nominal diameter, it is meant that the particle must be no less than about 850 microns thick at its narrowest or nominal dimension. Thus if the particle is spherical, it must have a diameter of at least about 850 microns while if it is cylindrical (as might be in the case of an extrudate), the diameter of the circular cross section must be at least about 850 microns and the length of the cylinder must be at least about 850 microns. Likewise if the particle shape of the extrudate is a cube or elongated box, no side or height may be less than about 850 microns. As set forth above, it is believed that by limiting the surface-impregnated platinum group component and the optionally surface-impregnated modifier metal component to at most a 400 micron exterior layer, diffusion paths are minimized and selectivity to the desired products is maximized. It would thus seem logical to decrease the diffusion paths further by reducing the support particle size more to less than 850 microns. However, a reduction in particle size leads to an increase in pressure drop through the catalyst bed and an increase in the problems associated therewith. Accordingly, the limiting of substantially all of the surface-impregnated catalytic species to at most the 400 micron exterior layer while limiting the catalyst particle to a nominal diameter of at least about 850 microns enables the minimization of diffusion paths while maintaining commercially practicable catalyst bed pressure drop and catalyst loading.

The preferred alumina carrier material may be prepared in any suitable manner from synthetic or naturally occurring raw materials. The carrier may be formed in any desired shape such as spheres, pills, cakes, extrudates, etc. A preferred shape of alumina is the sphere. It is essential that the particle size be such that it has a nominal diameter of at least about 850 microns, though particles having a nominal diameter of about 1600 microns are preferred.

To make alumina spheres, aluminum metal is converted into an alumina sol by dissolving it in a suitable acid, and then dropping a mixture of the resulting sol and a gelling agent such as urea into an oil bath to form spherical particles of an alumina gel which are easily converted into the preferred gamma or eta-alumina carrier material by known methods including aging, drying and calcining. To make alumina cylinders, an alumina powder is mixed with water and enough of a suitable peptizing agent such as nitric acid, for example, until an extrudable dough is formed. The dough is then extruded through a suitably sized die and cut to form extrudate particles. Other shapes of the alumina carrier material may also be prepared by conventional methods. After the alumina particles are shaped, generally they are dried and calcined. The alumina carrier may be subjected to intermediate treatments during its preparation, including washing with water or a solution of ammonium hydroxide, for example, which treatments are well known in the art. As mentioned, the modifier metal component is preferably added, and other components may be added to the preferred alumina carrier material during its preparation. For example, modifier metal component can be cogelled or coprecipitated with the alumina hydrosol or it may be added to the extrudable alumina dough, etc.

As indicated above, the catalyst of the present invention has particular utility as a hydrocarbon conversion catalyst. The hydrocarbon which is to be converted is contacted with the catalyst at hydrocarbon conversion conditions. These conditions include a temperature of from about 200° to 1000° C., a pressure of from atmospheric to about 25 atmospheres gauge and liquid hourly space velocities of from about 0.1 to about 200 $hr^{-1}$.

According to one embodiment of the invention, dehydrogenatable hydrocarbons are contacted with the catalytic composite of the instant invention in a dehydrogenation zone maintained at dehydrogenation conditions. This contacting may be accomplished in a fixed catalyst bed system, a moving catalyst bed system, a fluidized bed system, etc., or in a batch-type operation. A fixed bed system is preferred. In this fixed bed system the hydrocarbon feed stream is preheated to the desired reaction temperature and then passed into the dehydrogenation zone containing a fixed bed of the catalyst. The dehydrogenation zone may itself comprise one or more separate reaction zones with heating means therebetween to ensure that the desired reaction temperature can be maintained at the entrance to each reaction zone. The hydrocarbon may be contacted with the catalyst bed in either upward, downward or radial flow fashion. Radial flow of the hydrocarbon through the catalyst bed is preferred for commercial scale reactors. The hydrocarbon may be in the liquid phase, a mixed vapor-liquid phase or the vapor phase when it contacts the catalyst. Preferably, it is in the vapor phase.

Hydrocarbons which may be dehydrogenated include dehydrogenatable hydrocarbons having from 2 to 30 or more carbon atoms. These hydrocarbons would include normal paraffins, branched paraffins, cycloparaffins, normal olefins, branched olefins, cycloolefins, diolefins, polyolefins, and the like hydrocarbons.

Examples of preferred paraffins include the normal paraffins ethane, propane, butane, pentane, hexane, and the like up to $C_{30}$ normal paraffin. Preferred branched paraffins would include isobutane, isopentane, isohexane, 2-methyl-1-dodecane, and the like hydrocarbons. Preferred cycloparaffins include cyclobutane, cyclopentane, cyclohexane, cyclododecane, and the like cycloparaffins.

Examples of olefins useful in the dehydrogenation process of this invention include normal olefins such as ethylene, propylene, 1-butene, 2-butene, 1-pentene, 2-pentene, 1-dodecene, and 4-dodecene among others. Useful branched olefins include isohexene, isopentene, 3-methyl-1-dodecene, and 4-methyl-1-nonene among others. Also useful are cycloolefins such as cyclooctene, cyclopentene, cyclohexene, cyclononene, and cyclododecene. Finally, diolefins and polyolefins useful in the process include among others 1,9-decadiene, cyclodeca-1,9-diene, 1,7-decadiene, and 1,5-decadiene. The catalyst is particularly useful for dehydrogenating hydrocarbons such as those mentioned above having from 2 to 15 or more carbon atoms.

Dehydrogenation conditions include a temperature of from about 400° to about 900° C., a pressure of from about 0.01 to 10 atmospheres and a liquid hourly space velocity (LHSV) of from about 0.1 to 100 $hr^{-1}$. Generally for normal paraffins the lower the molecular weight the higher the temperature required for comparable conversion. The pressure in the dehydrogenation zone is maintained as low as practicable, consistent with equipment limitations, to maximize the chemical equilibrium advantages. The preferred dehydrogenation conditions of the process of this invention include a temperature of from about 525°–700° C., a pressure from about 0.1 to 5 atmospheres, and a liquid hourly space velocity of from about 0.1 to 20 $hr^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbon-rich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds.

The dehydrogenatable hydrocarbons may be admixed with a diluent gas before, while, or after being passed to the dehydrogenation zone. The diluent material may be hydrogen, steam, methane, carbon dioxide, nitrogen, argon and the like or a mixture thereof. Hydrogen is the preferred diluent. Ordinarily, when a diluent gas is utilized as the diluent it is utilized in amounts sufficient to ensure a diluent gas to hydrocarbon mole ratio of about 0.1 to about 20, with best results being obtained when the mole ratio range is about 1 to 10. The diluent hydrogen stream passed to the dehydrogenation zone will typically be recycled hydrogen separated from the effluent from the dehydrogenation zone in the hydrogen separation zone.

Water or a material which decomposes at dehydrogenation conditions to form water such as an alcohol, aldehyde, ether or ketone, for example, may be added to the dehydrogenation zone, either continuously or intermittently, in an amount to provide, calculated on the basis of equivalent water, about 1 to about 20,000 weight ppm of the hydrocarbon feed stream. About 1 to about 10,000 weight ppm of water addition gives best results when dehydrogenating paraffins having from 6 to 30 or more carbon atoms.

To be commercially successful, a dehydrogenation catalyst should exhibit three characteristics, namely high activity, high selectivity and good stability. Activity is a measure of the catalyst's ability to convert reactants into products at a specific set of reaction conditions, that is, at a specified temperature, pressure, contact time and concentration of diluent such as hydrogen, if any. For dehydrogenation catalyst activity, the conversion or disappearance of paraffins in percent relative to the amount of paraffins in the feedstock was measured. Selectivity is a measure of the catalyst's ability to convert reactants into the desired product or products relative to the amount of reactants converted. For catalyst selectivity, the amount of olefins in the product, in mole percent, relative to the total moles of the paraffins converted was measured. Stability is measure of the rate of change with time on stream of the activity and selectivity parameters—the smaller rates implying the more stable catalysts.

Since dehydrogenation of hydrocarbons is an endothermic reaction and conversion levels are limited by chemical equillibrium, it is desirable in order to achieve high conversion to operate at high temperatures and low hydrogen partial pressures. At such severe conditions, it is difficult to maintain high activity and selectivity for long periods of time because undesirable side reactions such as aromatization, cracking, isomerization and coke formation increase. Therefore, it is advantageous to have a new hydrocarbon dehydrogenation catalyst with improved activity, selectivity and stability characteristics.

The following examples are introduced to further describe the catalyst and process of the invention. The examples are intended as illustrative embodiments and should not be considered to restrict the otherwise broad interpretation of the invention as set forth in the claims appended hereto.

EXAMPLE I

In order to demonstrate the advantages to be achieved by the present invention, a first control catalyst, different from the invention, was prepared. First, a spherical alumina support was prepared by the well-known oil-drop method. A tin component was incorporated in the support by commingling a tin component precursor with the alumina hydrosol and thereafter gelling the hydrosol. The tin component in this case was uniformly distributed throughout the catalyst particle. The spherical alumina support containing a tin component had a diameter of about 1500 microns. 28.2 Grams of the tin-containing support was then impregnated with a 100 cc aqueous solution comprising 18.6 grams of a 0.92 wt. % $LiNO_3$ solution, and 4.8 grams of a 2.45 wt. % $H_2PtCl_6$ solution. After impregnation the catalyst was oven-dried at about 150° C. for 2 hours in the presence of 10% steam followed by heating at 540° C. for $\frac{1}{2}$ hour in the absence of steam. This catalyst was designated Catalyst A and comprised about 0.41 wt. % platinum, about 2.7 wt. % tin, and about 0.6 wt. % lithium all uniformly distributed throughout the catalyst particle.

EXAMPLE II

In this example, a catalyst was prepared in accordance with the invention. The same tin containing spherical support utilized in Example 1 was used for the catalyst of this example. 27 Grams of the support was contacted with 100 cc of an impregnation solution containing 18.2 grams of a 0.92 wt. % $LiNO_3$ solution and 0.26 grams of thiomalic acid (TMA). The mixture was contacted for 15 minutes in a coid rotary evaporator after which 4.4 grams of a 2.54 wt. % $H_2PtCl_6$ solution was added to the mixture. The mixture was allowed to contact for 15 additional minutes after which the solution was evaporated with steam. This took approximately 90 minutes. The resulting impregnated base was calcined at 540° C. for 2 hours in the presence of 10% steam followed by $\frac{1}{2}$ hour at 540° C. with no steam. The resulting surface-impregnated platinum catalyst designated as Catalyst B was prepared in accordance with the present invention and had a final composition of about 0.42 wt. % Pt, 0.6 wt. % Li, and 2.7 wt. % Sn.

EXAMPLE III

In order to demonstrate the effectiveness of a multidentated ligand/platinum group metal component complex in producing a catalyst surface impregnated with a platinum group metal component utilizing an impregnation technique different than that used in Example II, two catalysts were formulated, one in accordance with the catalyst of the present invention and one in accordance with the prior art.

First, a spherical alumina support was prepared by the well known oil-drop drop method. A tin component was incorporated into the support by commingling a tin component precursor with the alumina hydrosol and thereafter gelling the hydrosol. The tin component in this case was uniformly distributed throughout the catalyst particle. The alumina support containing a tin component had a diameter of about 1500 microns. This support was used in the formulation of the following two catalysts.

Catalyst C was prepared without utilizing a multidentated ligand for complexing the platinum, and thus is a prior art, uniformly impregnated platinum-containing catalyst. Catalyst C was prepared by combining 31.2 grams of the catalyst support prepared above with 4.7 grams of a 2.52 wt. % $H_2PtCl_6$ solution, 18.63 grams of a 1.02 wt. % $LiNO_3$ solution, 1.5 grams of a 71 wt. % $HNO_3$ solution, and 78.2 grams of water in a rotary steam evaporator. The combined base and solution was cold rolled for 15 minutes and then the liquid was evaporated over a period of 2 hours. The impregnated base was then dried in an oven at 150° C. for 2 hours followed by calcination at 540° C. for 2.5 hours. The resulting catalyst was comprised of 0.39 wt. % platinum, 0.63 wt. % lithium, and 1.23 wt. % tin.

Catalyst D was prepared in accordance with a catalyst of the present invention utilizing thiolactic acid during the impregnation step. Catalyst D was prepared by combining 27.3 grams of the catalyst support prepared above with 3.94 grams of a 2.63 wt. % solution of $H_2PtCl_6$, 16.03 grams of a 1.03 wt. % solution of $LiNO_3$, 0.0556 gram of thiolactic acid, and 80.0 grams of water in a rotary steam evaporator. The mixture was allowed to cold roll for 30 minutes after which the liquid was evaporated over a period of 90 minutes. The resulting catalyst was dried at 150° C. for 2 hours followed by calcination for 2½ hours in the presence of 10 wt. % steam. The resulting catalyst was comprised of 0.35 wt. % platinum, 0.64 wt. % lithium, and 1.25 wt. % tin.

EXAMPLE IV

In this example, Catalysts A, B, C, and D were evaluated as catalysts for the dehydrogenation of normal paraffins. These tests were carried out in a pilot plant comprising a reactor and product separation facilities. The charge stock was passed into the reaction zone wherein it was contacted with the catalyst. The effluent from the reaction zone was thereafter separated and analyzed. The charge stock used in testing Catalysts A and B comprised on a normalized basis about 22.0 wt. % normal $C_{10}$ paraffins, 40.0 wt. % normal $C_{11}$ paraffins, 28.0 wt. % normal $C_{12}$ paraffins, 9.0 wt. % normal $C_{13}$ paraffins, and 1.0 wt. % normal $C_{14}$ paraffins. The charge stock used in testing Catalysts C and D comprised on a normalized basis about 11.9 wt. % normal $C_{10}$ paraffins, 26.5 wt. % normal $C_{11}$ paraffins, 33.8 wt. % normal $C_{12}$ paraffins, and 27.3 wt. % normal $C_{13}$ paraffins. All tests were performed at similar pilot plant conditions. The reaction zone was maintained at a pressure of about 138 kPa. The charge stock was passed into the reaction zone at a rate sufficient to produce a liquid hourly space velocity of about 70 $hr^{-1}$. Hydrogen was fed to the reaction zone at a rate sufficient to provide a molar hydrogen to hydrocarbon ratio of about 4:1. The feedstock was heated to a temperature of 495° C. prior to contact with the catalyst. The water content of the reaction zone was maintained at about 2000 ppm by weight. Additionally, all catalysts were reduced in a hydrogen atmosphere at 500° C. for two hours prior to testing.

The results of these tests are set forth in Table 1 below. The data presented in Table 1 represents the normal paraffin conversion as a function of number of hours on-stream. The normal paraffin conversion is defined at the weight percent of the components in the fresh feed which actually underwent some kind of reaction divided by the total weight of the feed. A range of selectivity is also given for each catalyst. The selectivity is the weight percent of the converted product which was actually converted into the desired normal olefin.

TABLE 1

| | Wt. % of Feed Converted, Catalyst | | | |
|---|---|---|---|---|
| | A | B | C | D |
| Hours On-Stream | | | | |
| 2 | 6.4 | — | 16.4 | 17.6 |
| 6 | 6.2 | 15.7 | 16.0 | 17.4 |
| 10 | 5.9 | — | — | — |
| 14 | 5.8 | 15.1 | — | 16.1 |
| 18 | 5.5 | — | — | — |
| 22 | 5.7 | 14.7 | 13.9 | 15.4 |
| 26 | 5.4 | — | — | 14.7 |
| 30 | — | 14.1 | — | — |
| 34 | — | — | — | — |
| 38 | — | — | 13.1 | 14.0 |
| Selectivity (Wt. % Olefins) | 94.0–96.0 | 94.7–96.7 | 93.0–94.1 | 93.5–94.5 |

It should be reiterated that Catalysts A and C are not catalysts of the instant invention while Catalysts B and D are catalysts of the instant invention. Also when comparing the data above, the results of Catalysts A and B should be compared and the results of Catalysts C and D should be compared but no other comparisons should be attempted due to feedstock and catalyst metal level differences. A review of the data presented in Table 1 indicates that Catalysts B and D, the surface-impregnated catalysts of the instant invention, exhibit a superior performance in the dehydrogenation of paraffins to olefins than their corresponding prior art Catalysts A and C. In addition, the selectivity of the reaction towards the production of normal olefins is about 1% higher overall for the catalysts of the instant invention.

The ability of Catalysts A and B to convert the pilot plant feedstock varies significantly. This is primarily due to the tin to platinum molar ratio across the catalyst particle. For Catalyst A, the tin to platinum ratio is about 5 while for Catalyst B, the ratio varies from about 2 on the surface to about 20 inside the catalyst. It is well known that tin attenuates the activity of the platinum component and it can therefore be recognized that in the catalyst containing surface-impregnated platinum, the platinum is less attenuated where it is most useful, i.e. on the surface. This results in a significant conversion improvement in the conversion of the feedstock by the catalyst of the present invention.

EXAMPLE V

The catalyst of this example was prepared according to the method set forth in U.S. Pat. No. 3,584,060 (Rausch). This catalyst is different than that of the present invention. To produce the catalyst of this example, a spherical alumina support having a diameter of approximately 1500 microns was prepared by the well known oil drop method. An impregnation solution was next prepared by dissolving a small amount of stannic chloride in nitric acid. To this solution was added small amounts of a 3.26 wt. % Re solution of perrhenic acid and a 2.543 wt. % Pt solution of chloroplatinic acid. Water was added to bring the solution weight to 100 grams. The solution was combined with the spherical alumina support mentioned above. The impregnated spheres were dried at 150° C. for 2 hours. The dried spheres were next calcined at 540° C. for 2 hours in air with 10 wt. % steam added followed by calcination for ½ hour at 540° C. under an air atmosphere only.

This impregnation and finishing procedure resulted in a catalyst composite comprising the following levels of catalytically active metals; 0.388 wt. % platinum, 0.423 wt. % rhenium, and 0.366 wt. % tin. This catalyst will hereinafter be referred to as Catalyst E.

EXAMPLE VI

In this example, a catalyst was prepared according to the example set forth in U.S. Pat. No. 3,878,131 (Hayes). This catalyst is not the catalyst of the instant invention. A spherical alumina support approximately 1500 microns in diameter was prepared using the well known oil drop method. An impregnation solution was prepared by dissolving a small amount of stannous chloride in hydrochloric acid and diluting the solution further with water. Germanium tetrachloride dissolved in ethanol was next added to the solution followed by the addition to the solution of a small amount of chloroplatinic acid. The resulting impregnation solution was combined with the catalyst base mentioned above. The impregnated base was next dried for 2 hours at 150° C. The dried, impregnated base was then calcined for 2 hours at 540° C. under an air atmosphere with 10 wt. % steam added, followed by a ½-hour calcination at the same conditions without steam addition.

The resulting catalyst composite was determined by analysis to be comprised of the following amounts of catalytically active metals: 0.389 wt. % platinum, 0.263 wt. % tin; and 0.245 wt. % germanium. This catalyst will hereinafter be referred to as Catalyst F.

EXAMPLE VII

In this example, Catalysts B and D of the present invention and Catalysts A, C, E, and F of the prior art were evaluated by Scanning Electron Microscopy (SEM). The purpose of this analysis was to identify the relative distribution of impregnated metals across the radius of a catalyst pill of each example catalyst previously mentioned. Before proceeding, it should be noted that the SEM data does not show the actual level of metals at any one point within the catalyst pill, but indicates only the relative metals distribution profile in relation to the alumina level. In other words, the results of each analysis may not be based upon a zero point and attempting to integrate a distribution curve is not possible and could lead to interpretation errors as the entire curve could be shifted either up or down. Therefore the curves are useful for making relative comparisons of metal distributions only.

Figure 2:
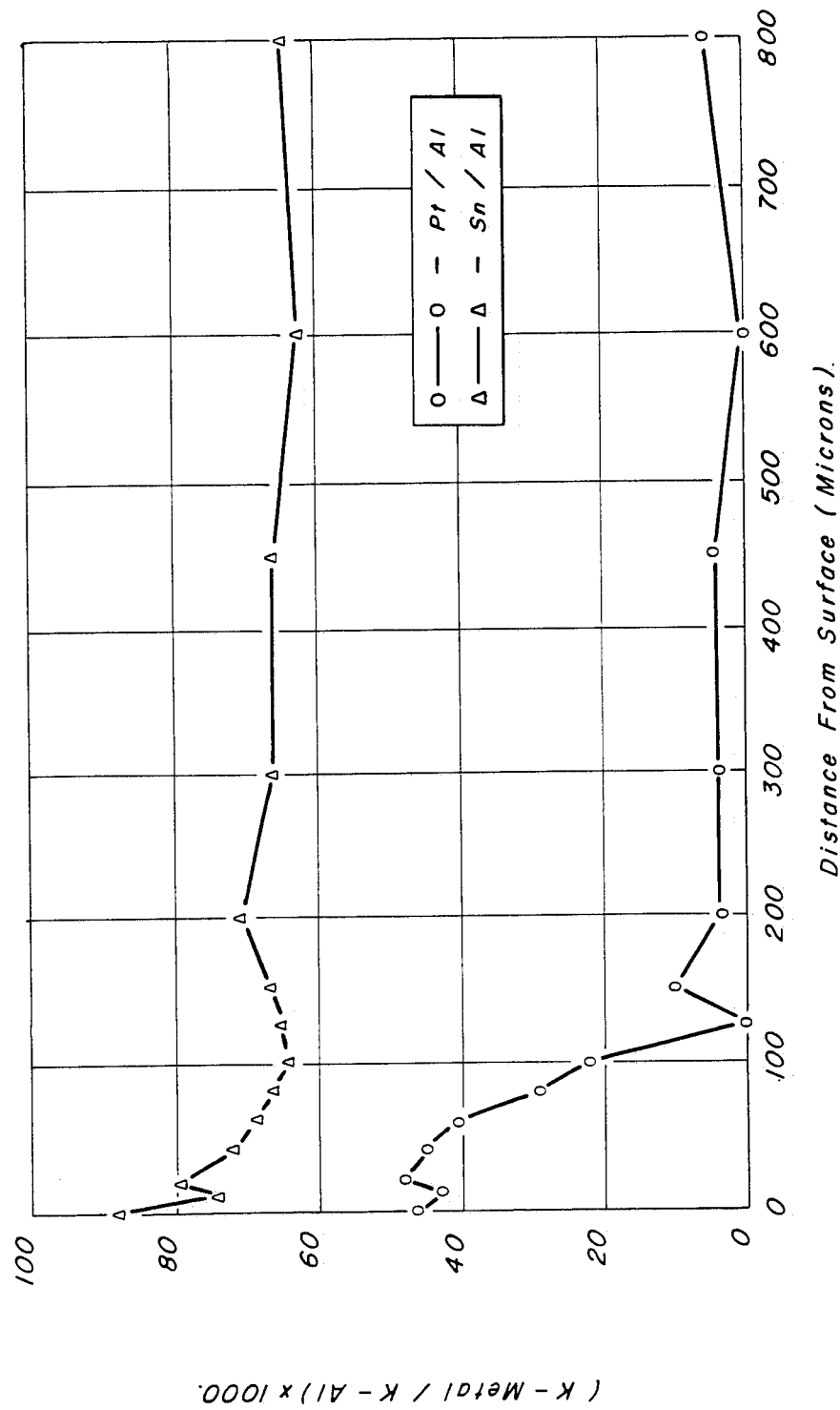
Figure 3:
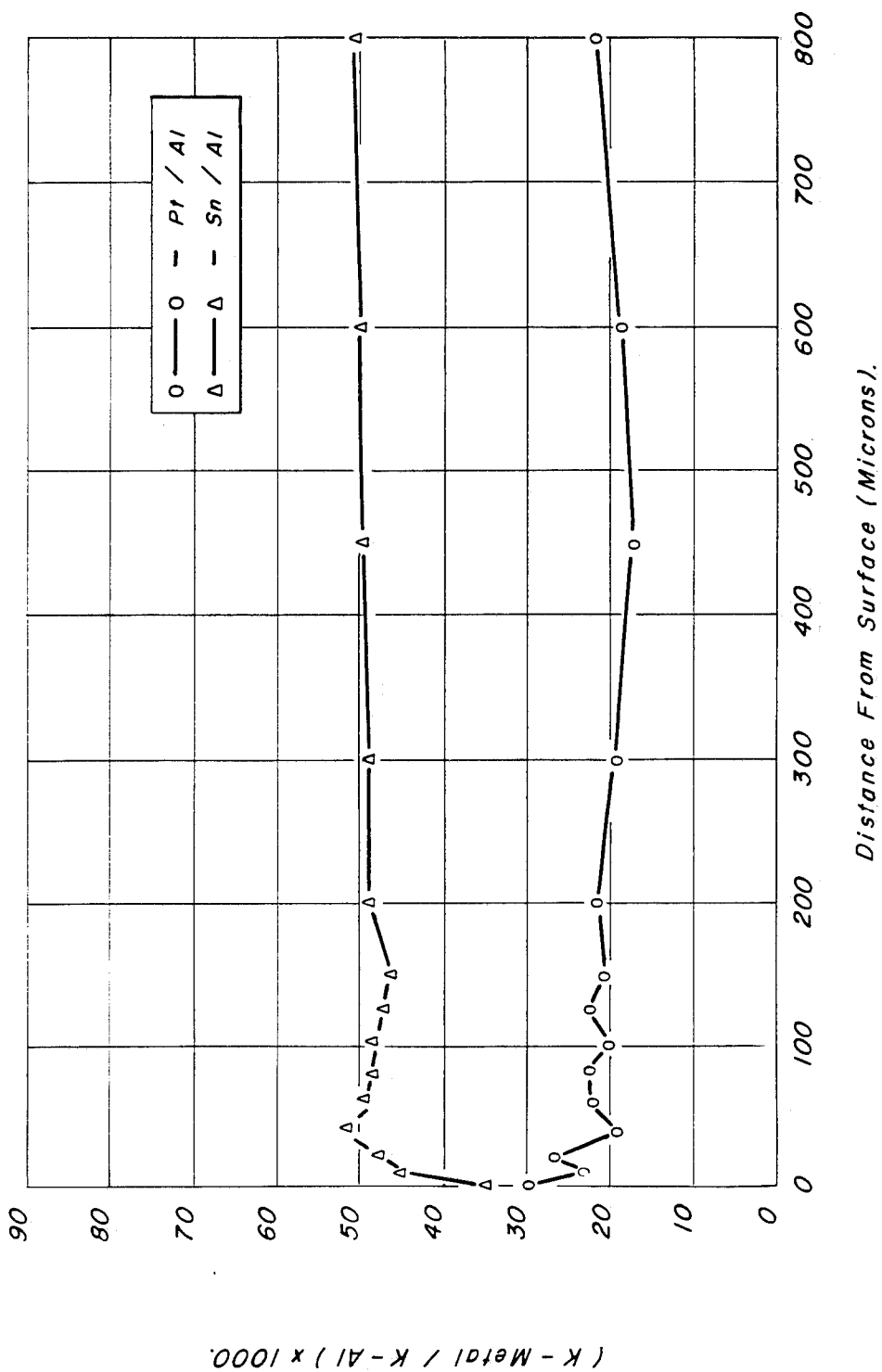
Figure 4:
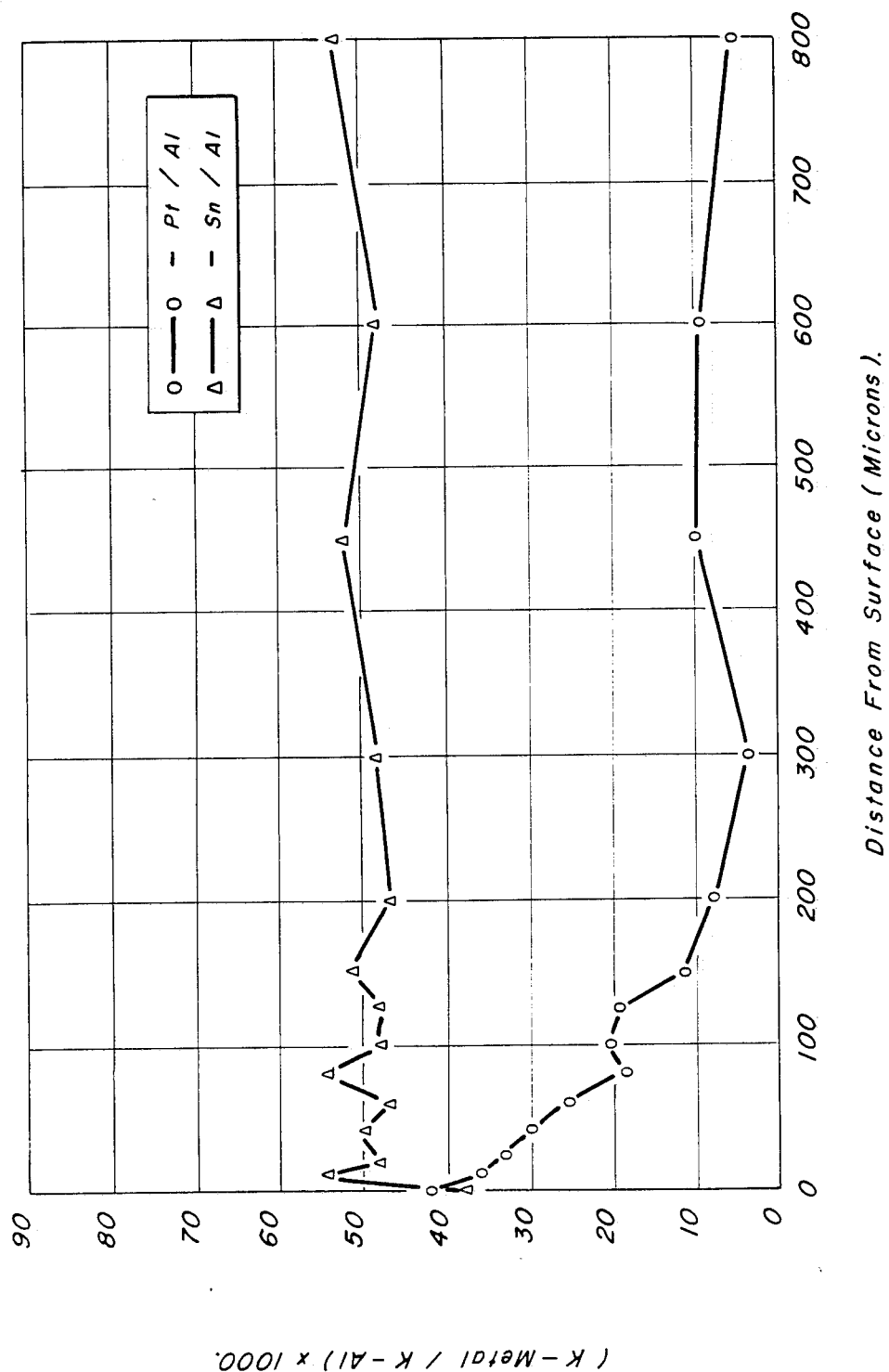
Figure 5:
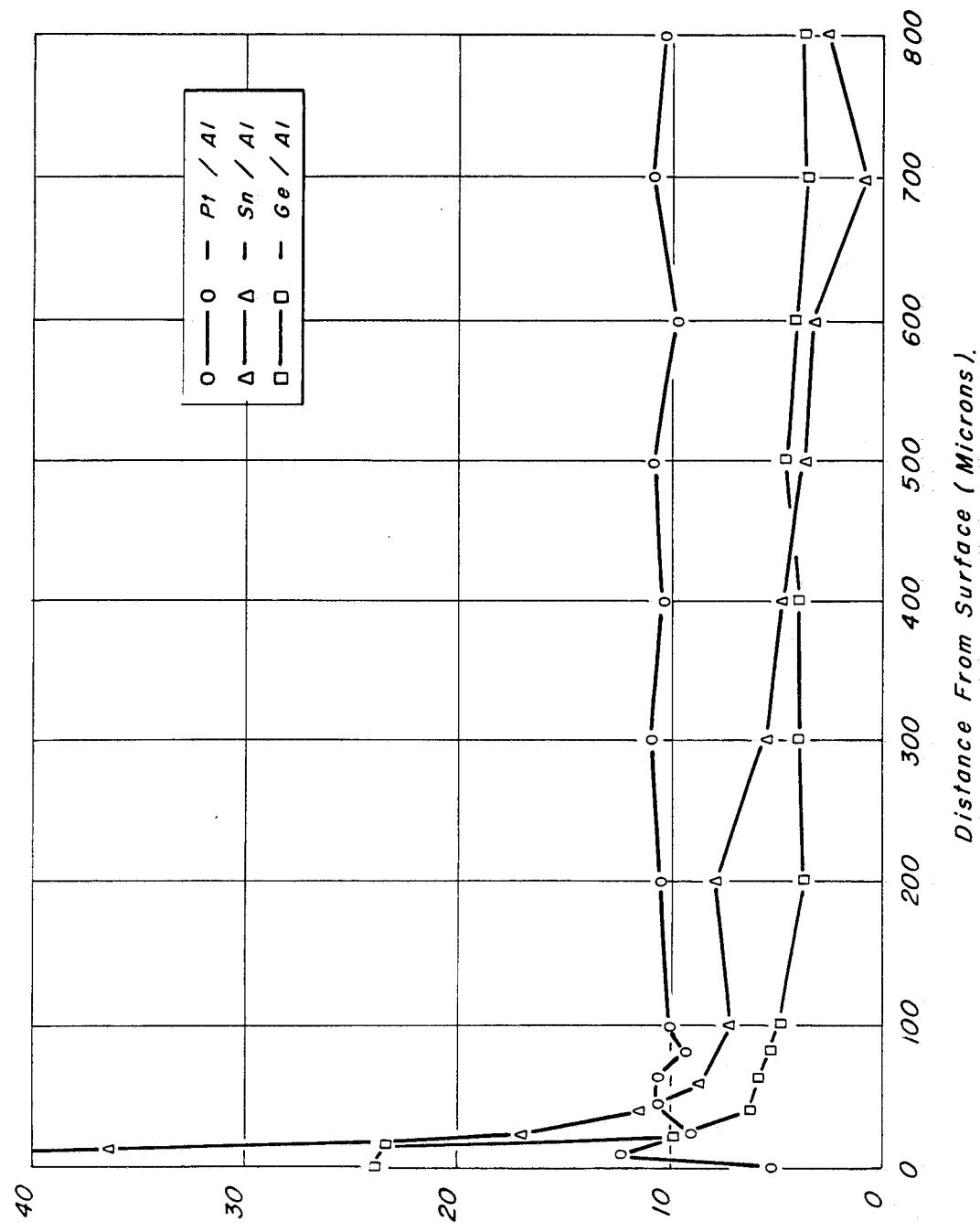
Figure 6:
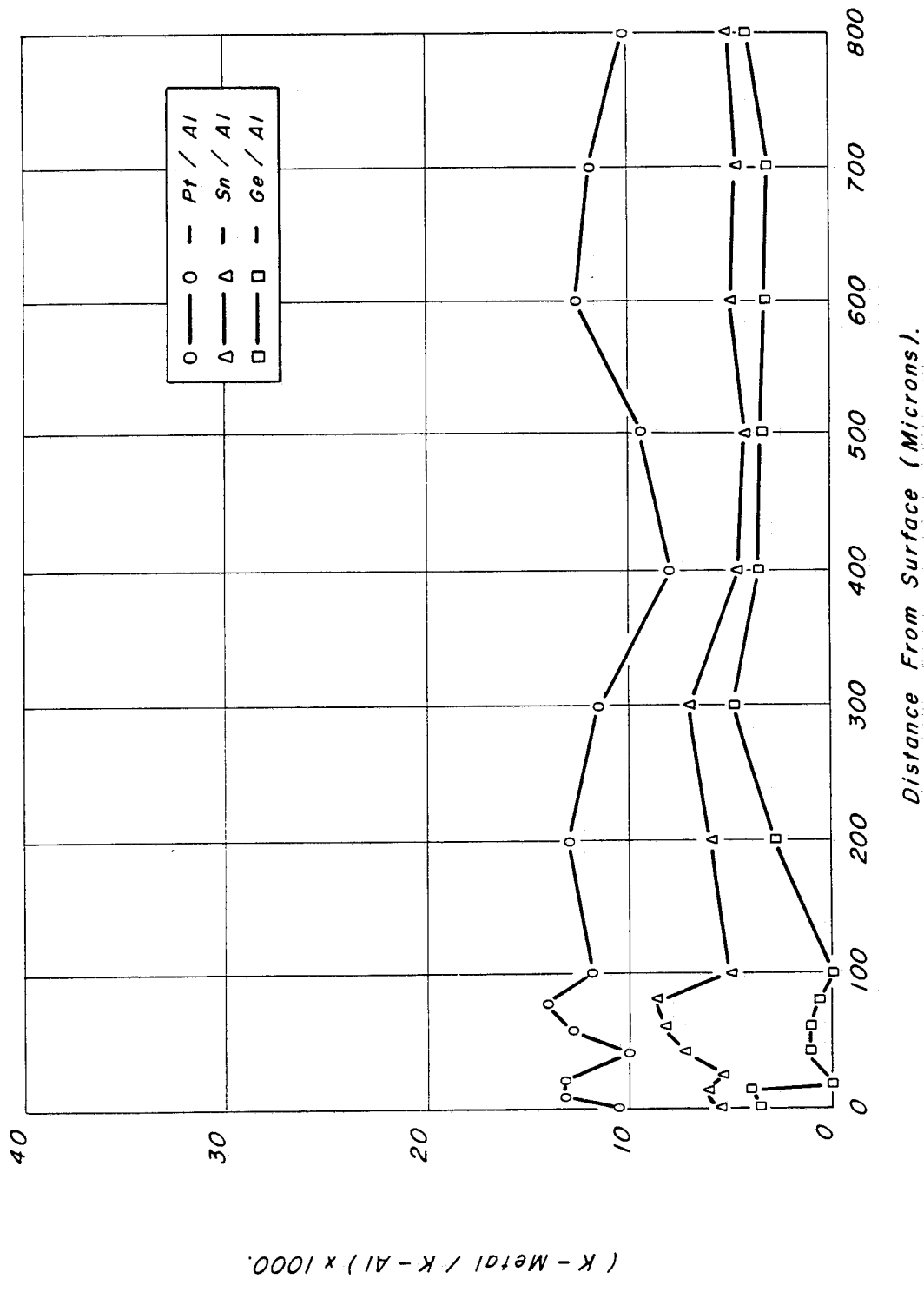

An examination of the platinum levels across the catalyst pills of Catalysts A, B, C, D, E, and F as found in FIGS. 1–6, respectively, shows the platinum distribution of Catalysts B and D of the instant invention to be contained essentially within the exterior layer of the catalyst particle. For Catalyst B, the platinum level begins at a (Pt K-metal/K-Al)*1000 value of about 44 on the surface of the particle and drops to a value of about 3 at a distance of 150 microns from the surface of the catalyst support. For Catalyst D, the platinum level in the outer 100 micron layer has an average (Pt K-metal/K-Al)*1000 value of about 30. This value drops constantly to a value of 10 approximately 200 microns from the outer surface of the catalyst and remains at about 10 through the remaining catalyst radius. Catalysts B and D can therefore be characterized as being surface-impregnated with platinum as the concentration of platinum in the 100 micron surface layer is over twice the relative platinum concentration in the 200 micron center core of the catalyst support for each catalyst. This is in contrast to Catalysts A, C, E, and F of the prior art which exhibits a constant (Pt K-metal/K-Al)*1000 values of 20, 20, 10, and 12, respectively across the entire radius of the catalyst pill as seen in FIGS. 1, 3, 5, and 6. These four catalysts therefore can be described as being uniformly impregnated with platinum.

What is claimed is:

1. A catalytic composite comprising a platinum group metal component, a modifier metal component selected from the group consisting of tin, germanium, rhenium, and mixtures thereof on a refractory oxide support having a nominal diameter of at least about 850 microns wherein the platinum group metal component is surface impregnated such that the average concentration of the surface-impregnated platinum group component on the outside 100 micron layer of the catalyst is at least 2 times the concentration of the platinum group component in the 200 micron diameter center core of the catalyst, and wherein the modifier metal component is uniformly impregnated through the refractory oxide support.

2. The catalytic composite of claim 1 further characterized in that the surface-impregnated platinum group metal component comprises a platinum component.

3. The catalytic composite of claim 1 further characterized in that the modifier metal component comprises a tin component.

4. The catalytic composite of claim 1 further characterized in that the catalyst contains a uniformly impregnated alkali or alkaline earth metal component or mixtures thereof.

5. The catalytic composite of claim 4 further characterized in that the uniformly impregnated alkali or alkaline earth metal component comprises lithium.

6. The catalytic composite of claim 1 further characterized in that the refractory oxide support comprises alumina.

7. The catalytic composite of claim 1 further characterized in that it comprises an optional halogen component.

8. The catalytic composite of claim 1 further characterized in that the optional halogen component comprises a chlorine component.

9. The catalytic composite of claim 1 further characterized in that it comprises an optional catalyst modifier component.

10. The catalytic composite of claim 9 further characterized in that the optional catalyst modifier component is selected from the group consisting of a thallium component, gallium component, and indium component.

11. A catalytic composite comprising from about 0.01 to about 2.0 wt. % of a platinum component, from about 0.01 to about 5.0 wt. % of a modifier metal component selected from the group consisting of tin, germanium, and rhenium, and mixtures thereof, and from about 0.01 to about 1.0 wt. % of a lithium component on an alumina support having a nominal diameter of at least about 850 microns wherein the platinum component is surface impregnated such that the average concentration of the surface-impregnated platinum component on the outside 100 micron layer of the catalyst is at least 2 times the concentration of the platinum component in the 200 micron diameter center core of the catalyst and wherein the modifier metal component, and lithium component are uniformly impregnated.

12. The catalytic composite of claim 11 further characterized in that the modifier metal component comprises a tin component.

* * * * *